United States Patent
Mor et al.

(10) Patent No.: US 11,775,877 B2
(45) Date of Patent: Oct. 3, 2023

(54) SYSTEM AND METHOD FOR ARTIFICIAL INTELLIGENCE BASE PREDICTION OF DELAYS IN PIPELINE PROCESSING

(71) Applicant: Genpact Luxembourg S.à r.l. II, Luxembourg (LU)

(72) Inventors: Yudhvir Mor, Rohtak (IN); Rakesh Verma, Pune (IN); Varun Anand, Delhi (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 392 days.

(21) Appl. No.: 16/863,841

(22) Filed: Apr. 30, 2020

(65) Prior Publication Data

US 2021/0125087 A1    Apr. 29, 2021

Related U.S. Application Data

(60) Provisional application No. 62/924,990, filed on Oct. 23, 2019.

(51) Int. Cl.
*G06N 20/00* (2019.01)
*G06N 20/20* (2019.01)
(Continued)

(52) U.S. Cl.
CPC .......... *G06N 20/20* (2019.01); *G06F 7/582* (2013.01); *G06F 18/213* (2023.01);
(Continued)

(58) Field of Classification Search
CPC .......... G06N 5/04; G06N 5/003; G06N 20/20; G06N 5/047; G06F 7/582; G06K 9/6227;
(Continued)

(56) References Cited

U.S. PATENT DOCUMENTS

2015/0379425 A1*  12/2015  Dirac ............... G06N 20/00
                                                706/12
2018/0040064 A1*  2/2018  Grigg ............... G06Q 30/0244
(Continued)

OTHER PUBLICATIONS

Wikipedia, Bootstrap aggregating (Year: 2022).*
(Continued)

*Primary Examiner* — Nancy Bitar
*Assistant Examiner* — Xiao Liu
(74) *Attorney, Agent, or Firm* — Goodwin Procter LLP

(57) ABSTRACT

A method and system are provided for training a machine learning (ML) system for predicting delays in processing pipelines. In one embodiment, the method includes receiving labelled historical data pertaining to a pipeline, the labelled data including trigger objects initiating the pipeline and one or more processing times corresponding to one or more stages of the pipeline. The method includes identifying features associated with the trigger objects, formatting the labelled data and, randomly splitting the formatted labelled data into a full training dataset and a testing dataset. Additionally, the method includes distributing the full training dataset into several partial datasets and, in an ensemble ML system, training each of several ML subsystems using a respective partial dataset to provide a respective individual inference model predicting respective processing times, and deriving and storing an ML model for prediction of delays by aggregating the individual inference models.

31 Claims, 6 Drawing Sheets

(51) Int. Cl.
  *G06N 5/04* (2023.01)
  *G06F 7/58* (2006.01)
  *G06F 18/213* (2023.01)
  *G06F 18/214* (2023.01)
  *G06F 18/20* (2023.01)
  *G06N 5/01* (2023.01)

(52) U.S. Cl.
  CPC .......... *G06F 18/214* (2023.01); *G06F 18/285* (2023.01); *G06N 5/01* (2023.01); *G06N 5/04* (2013.01)

(58) Field of Classification Search
  CPC ... G06K 9/6232; G06K 9/6256; G06K 9/6257
  See application file for complete search history.

(56) References Cited

U.S. PATENT DOCUMENTS

2020/0234349 A1* 7/2020 Deshmukh ............. G06Q 30/04
2020/0320493 A1* 10/2020 Drucker ................. G06Q 40/06

OTHER PUBLICATIONS

Tater et al, Prediction of Invoice Payment Status in Account Payable Business Process, ICSOC 2018, LNCS 11236, pp. 165-180 (Year: 2018).*
Rokach, Ensemble-based classifiers, Artif Intell Rev (2010) 33:1-39 (Year: 2010).*

* cited by examiner

302

Processing Lag

| Algorithm | R2 Score | MAE | MSE | RMSE |
|---|---|---|---|---|
| Random Forest | 0.62 | 6.07 | 83.38 | 9.13 |
| Extra Tree Regression | 0.48 | 7.58 | 103.07 | 10.15 |
| AdaBoost | 0.21 | 9.79 | 128.84 | 11.35 |
| Gradient Boosting | 0.42 | 8.08 | 110.58 | 10.52 |

304

Receiving Lag

| Algorithm | R2 Score | MAE | MSE | RMSE |
|---|---|---|---|---|
| Random Forest | 0.57 | 5.52 | 63.31 | 7.96 |
| Extra Tree Regression | 0.56 | 5.73 | 65.24 | 8.08 |
| AdaBoost | 0.32 | 7.64 | 85.00 | 9.22 |
| Gradient Boosting | 0.41 | 5.69 | 78.72 | 8.87 |

306

Approval Lag

| Algorithm | R2 Score | MAE | MSE | RMSE |
|---|---|---|---|---|
| Random Forest | 0.44 | 1.40 | 3.65 | 1.91 |
| Extra Tree Regression | 0.44 | 1.84 | 5.97 | 2.44 |
| AdaBoost | 0.15 | 2.23 | 7.20 | 2.68 |
| Gradient Boosting | 0.39 | 1.84 | 6.21 | 2.49 |

308

Payment Lag

| Algorithm | R2 Score | MAE | MSE | RMSE |
|---|---|---|---|---|
| Random Forest | 0.53 | 22.75 | 913.94 | 30.23 |
| Extra Tree Regression | 0.44 | 24.40 | 994.63 | 31.54 |
| AdaBoost | 0.21 | 29.42 | 1183.25 | 34.40 |
| Gradient Boosting | 0.52 | 21.49 | 899.88 | 30.00 |

MAE = Mean Absolute Error | MSE = Mean Squared Error | RMSE = Root Mean Squared Error

FIG. 3

SYSTEM AND METHOD FOR ARTIFICIAL INTELLIGENCE BASE PREDICTION OF DELAYS IN PIPELINE PROCESSING

CROSS-REFERENCE TO RELATED APPLICATIONS

This application claims priority to and benefit of U.S. Provisional Patent Application No. 62/924,990, entitled "System and Method for Predicting Paid on Time Risk and Delay for Accounts Payable," filed on Oct. 23, 2019, the entire contents of which are incorporated herein by reference.

FIELD

This disclosure generally relates to artificial intelligence (AI) based/machine learning (ML) techniques and, in particular, to training and use of AI/ML systems to predict delays that can occur in a pipelined process.

BACKGROUND

A number of tasks that are routinely undertaken in the real world involve pipeline processing, i.e., a sequence of operations. Each individual operation in a high-level sequence/pipeline may itself involve another lower level sequence or pipeline. Consider, for example, the maintenance of a nuclear power plant. At a high level, the maintenance pipeline may include inspection and repair of the reactor equipment, inspection and repair of the radiation containment equipment, and inspection and repair of the nuclear waste disposal.

Another example of a pipelined process is diagnosis of a tissue condition (such as tumor, abnormal, etc.), that may include obtaining a tissue sample, staining the tissue sample, obtaining a digital image of the sample, analyzing the image by one pathologist and diagnosing one or more conditions, analyzing the image by another pathologist to confirm the diagnosis, and reporting the results to a patient. Yet another example includes invoice processing, where an invoice is received, the invoice is then analyzed to determine if it is accurate, if not accurate, the errors may be listed, payment may be made if the invoice is accurate and the errors may be reported, otherwise.

In an pipelined process, a delay can occur at any stage of the pipeline. Unavailability of resources such as personnel, tools, and materials (e.g., parts needed for repair or replacement), is often a reason for the delay. Such delays can cause not only dissatisfaction of various entities, such as patients, vendors, etc., but can also lead to other disruptions, such as cancellation of a flight or shutting down of a manufacturing equipment because maintenance certificates for the aircraft or the equipment were delayed.

SUMMARY

Methods and systems for training AI/ML systems and use of such systems for accurately predicting the delays in a pipelined process, are disclosed. The predicted delays can be used to reallocate the resources so that timely operation of critical processes and/or excessive delays overall may be avoided or mitigated. According to one embodiment a method for training includes receiving labelled historical data pertaining to a pipeline, where the labelled data includes trigger objects initiating the pipeline and one or more processing times corresponding to one or more stages of the pipeline. The method also includes identifying one or more features associated with the trigger objects, formatting the labelled data and, using a pseudorandom generator, randomly splitting the formatted labelled data into a full training dataset and a testing dataset. Additionally, the method includes distributing the full training dataset into several partial datasets and, in an ensemble ML system, training each of several ML subsystems using a respective partial dataset to provide a respective individual inference model predicting respective one or more processing times at one or more stages of the pipeline in terms of at least one feature, and deriving and storing an ML model for prediction of delays by aggregating the individual inference models.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings:

FIG. 3 illustrates performance of different machine learning systems in predicting the processing times of an exemplary pipeline;

DETAILED DESCRIPTION

Figures 1, 2:
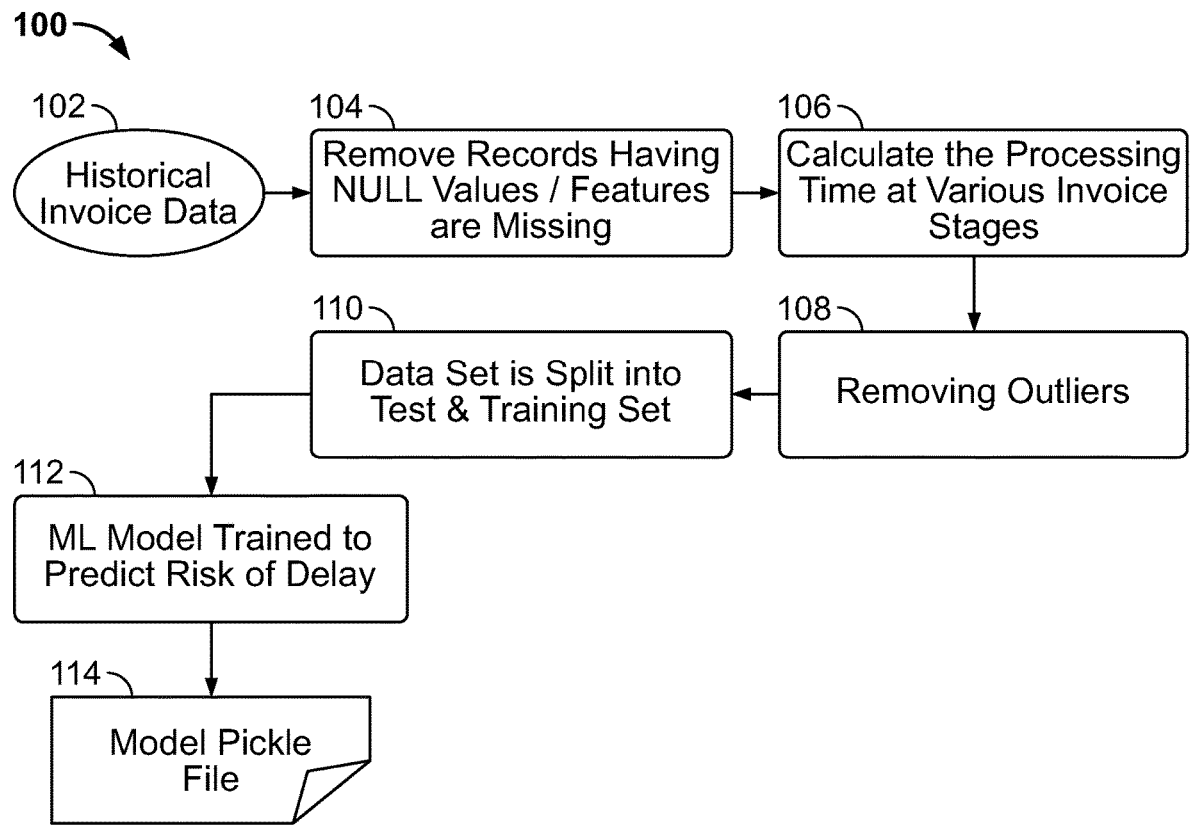
FIG. 1 is a flowchart of a processing of training a machine learning system to predict pipeline processing times, according to one embodiment.
FIG. 2 shows an exemplary encoding of a categorical feature, according to one embodiment.

The following disclosure provides different embodiments, or examples, for implementing different features of the subject matter. Specific examples of components and arrangements are described below to simplify the present disclosure. These are merely examples and are not intended to be limiting.

Various embodiments described herein feature a technique for predicting delays in a pipelined process. In addition to predicting the delay for the end-to-end process, delays at different stages of the pipelined process can be predicted, as well. The prediction is performed by one or more machine learning (ML) systems that are trained to identify hidden relationships between various features of the process and to predict the delays based on such inferred relationships.

The discussion below uses invoice processing as an example of a pipelined process for the sake of convenience only. Embodiments of the ML training and inferencing technique are not so limited, however, and can be used to predict delays in any pipelined process, such as maintenance of a manufacturing plant or a power generation system, digital image based diagnosis systems, an assembly line for automated manufacturing of complex products, such as computer chips, etc.

Processing of Invoices

One of the most challenging goals of an accounts payable department is to pay vendors/suppliers on time. It is crucial that businesses maintain good relationships with their vendors for the smooth functioning of business operations. A company can achieve this by paying its dues on time. In a typical accounts payable department, an invoice goes through different stages of processing and each stage may include several sub-tasks. The typical stages in an invoice lifecycle in an accounts payable department generally include: account processing; handling of exceptions—(e.g., not receiving a goods received note (GRN), quantity mismatch, price mismatch, etc.); approval; and payment. The entire process is complex, and a delay at any stage or a sub-task can lead to a delay in payment of one or more invoices. Therefore, it is important to prioritize invoices taking into consideration which invoices have a risk of getting delayed in the invoice processing at the accounts payable department.

One prior approach was to generalize rules across different vendors based on their types (e.g., utilities, raw materials, other services, etc.). A problem with this approach is that finding the relationship between vendors and generating rules for them is a complex task. The problem generally gets even worse when the number of vendors increases (e.g., hundreds or thousands of vendors). This number often changes since new vendors may be selected over time. Approaches that rely on rigid rules for each vendor are therefore usually not feasible and scalable. To summarize, the challenges addressed by various known techniques include: accuracy; maintainability; scalability; error minimization; and need for flexible and simple rules.

Overview of Machine Learning Based Delay Prediction

In various embodiments, a machine learning based system described herein finds patterns among various features of a pipelined process (e.g., invoice processing, equipment maintenance, diagnosis using digital images, etc.), where such features are obtained from historical data about the respective processes.

Some features (referred to as direct features) are characteristics of the subject matter of the pipelined process. For example, in the case of invoice processing, the direct features correspond to various explicit characteristics of invoices that are processed. Features 1-10 in Table 1 are direct features in the context of invoice processing. Other features, referred to as derived features, are those that are extracted from the attributes/characteristics of the pipelined process or the subject matter of the process. For example, in the case of invoice processing, attributes such as day of week, which is deduced from the date printed on the invoice, is a derived feature. Features 11-25 in Table 1 are derived features of invoice processing. Different embodiments of the ML system use different sets of features from all of the available features.

The invoice features shown in Table 1 below are used to train some embodiments of a machine learning system. Some features are extracted from invoices themselves, while other features like ratios, vendor specific statistics, etc. are derived from an accounts payable workflow system using APIs.

TABLE 1

| Feature No. | Feature | Description |
| --- | --- | --- |
| 1 | Month | Month number in which invoice is created/Received. |
| 2 | Payment term days | Number of days in which payment is due. |
| 3 | Payment term type | Invoice due from-Invoice date/Receipt date/GRN date/immediate. |
| 4 | Invoice Type | Type of Invoice PO/Non-PO |
| 5 | Source of Invoice | Source from where invoice is received. |
| 6 | Vendor | Vendor Id |
| 7 | Total Amount | Total amount of invoice |
| 8 | Legal Entity | Business Unit/OU |
| 9 | Currency | Currency in which Invoice is generated. |
| 10 | Disputed | Indicator of whether invoice was disputed or not for any exception. |
| 11 | Day of Week | Day number of week. |
| 12 | Number of invoices paid | Number of paid invoices for Vendor X. |
| 13 | Number of Invoice paid late | Number of invoices that are paid late for Vendor X. |
| 14 | Ratio of invoice that are late | Number of Invoice paid late/Number of invoices paid |
| 15 | Sum of total amount of invoices paid | Total sum of invoices that are paid to Vendor X. |
| 16 | Sum of total amount of invoices paid late | Total sum of invoices that are paid late to Vendor X. |
| 17 | Ratio of amount that are late | Sum of total amount of invoices paid late/Sum of total amount of invoices paid |
| 18 | Average days for invoice that are paid late | Average days for the invoice that are paid late for Vendor X. |
| 19 | Number of Invoice Outstanding | Total number of Invoices outstanding for Vendor X. |
| 20 | Number of Invoices outstanding that | Number of outstanding invoices that are already late for Vendor X. |

TABLE 1-continued

| Feature No. | Feature | Description |
|---|---|---|
| | are already late | |
| 21 | Ratio of outstanding Invoices that are late | Number of Invoices outstanding that are already late/ Number of Invoice Outstanding |
| 22 | Sum of total amount of outstanding invoices | Total sum of outstanding invoices to Vendor X. |
| 23 | Sum of total amount of outstanding invoices that are late | Total sum of outstanding invoices that are late to Vendor X. |
| 24 | Ratio of outstanding amount that are late | Sum of total amount of outstanding invoices that are late/ Sum of total amount of outstanding invoices |
| 25 | Average days for outstanding invoice that are late | Average days for the outstanding invoice that are late for Vendor X. |

Likely Processing Time at Each Stage: In various embodiments, the ML system described herein uses several features obtained from historical process data and delays at various stages of the process pipeline. Using these inputs, embodiments of the ML system are trained to predict processing delays at different stages based on the features and relationships between the features that are identified by the ML system.

In the context of invoice processing, some embodiments of the ML system analyze historical invoices, identifies feature patterns such as seasonality and delay, vendor type and delay, invoice category and delay, day of the week and delay, amount of invoice and delay, etc. Using these patterns, different embodiments of the ML system learn to predict the pipeline behavior, i.e., the fluctuation in processing time at different stages, based on various process features. In general, any feature can impact the processing time/delay at one or more pipeline stages. The delay model learned by various embodiments of the ML system can represent such impact of one or more features and feature combinations.

During inferencing, an embodiment of a trained ML system can analyze various features associated with a trigger that usually commences a process. For example, in the case of invoice processing, the trigger can be a newly received invoice. In the case of an image diagnosis system, the trigger can be a newly received image. By analyzing the features, and using the model learned during the training phase, an embodiments of the ML system can predict the expected processing times at various stages of the pipelined process and the overall processing delay, if any. In the context of invoice processing, some embodiments can predict whether an invoice has a risk of being delayed at one or more stages. For example, the processing time of invoices can be high at the close of a financial year, e.g., due to the workload of preparing other accounting statements. Likewise, the feature of the day of the week may also impact the processing time.

Assignment Delay: Some embodiments of the ML system are trained to predict the assignment delay, i.e., the delay in commencing a pipelined process, typically arising due to a lack of resources available for the first and/or later stages of the pipeline. To this end, these embodiments account for the workload of the resources such as personnel, specialized equipment, computing resources, etc. The workload and/or resource capacity may be received as input(s) by some embodiments of the ML system. In the case of invoice processing, the current personnel workload and/or available capacity may be obtained from an accounts payable workflow system, using an API.

Process Category: Some embodiments of the ML system use a pre-trained ontology of the different categories of the processing of a particular kind that is to be performed. For example, in the case of processing of tissue images for diagnosis, categories such as processing of brain tissue, processing of lung tissue, processing of breast tissue, etc., may be considered. In the case of invoice processing, categories such as utilities invoices, raw materials invoices, stationery invoices, information technology (IT) equipment invoices, administrative invoices, sundry invoices, etc., may be considered.

Such an ontology may be created by analyzing historical data pertinent to the particular processing pipeline, e.g., tissue images in the case of a diagnosis pipeline, line items in invoices in the case of invoice processing, etc. To obtain a pre-trained ontology, a particular object that is involved with a processing pipeline may be labelled automatically by some embodiments of the ML system, or may be labelled by user.

An example of a pre-trained ontology for invoice processing is:

```
{
    "Stationery.Pencil": ["Natraj HB", "Apsara HB", "Pencil" +
    Synonyms]
    "Stationery.Notebook": ["Notebook", "Sketch Pad", "Writing
    Book" + Synonyms]
    "IT Equipment": ["Laptop", "Routers", "Monitors", "Mouse" +
    Synonyms]
}
```

In this ontology, the words "Nataraj HB" "Apsara HB" and "Pencil" indicate different type of pencils, which belong to the category "stationary." The words "notebook," "sketchpad," etc., also belong to the category stationary. The words "laptop", "routers", "monitors", "mouse," etc., belong to the category IT equipment.

Category Importance: A user may specify the importance of a particular category. For example, for image diagnosis, the category lung tissue may be assigned a high importance for a number of reasons such as high likelihood of developing complications within hours or days, limited availability of lung-treatment resources, etc. The category brain tissue may be assigned medium importance, e.g., because the issues may be severe but they may develop over a longer time relative to lung issues, and the category breast tissue may be assigned low importance, e.g., because a large number of issues may be relatively minor and both the minor and critical issues may typically develop relatively slowly, over several months.

In the case of invoice processing, in some instances each of the categories utilities, raw materials, IT equipment, sundry, etc., may be assigned an importance level such as high medium, or low as shown in the example below:

```
{
    "High": ["Utilities", "Raw Materials"],
    "Medium": ["IT Equipment", "Administrative Invoices"],
    "Low": ["Stationery.All", "Sundry Invoices"]
}
```

In some embodiments, the importance of different categories is represented using a JSON configuration file. A user interface may be provided to generate the configuration file.

FIG. 1 is a flowchart of training an ML system to predict delays in various stages of a processing pipeline. Some embodiments generate a machine learning model used for predicting the risk of payment delay. In the training process 100, historical data for a particular pipeline for which the delay(s) are to be predicted is received in step 102. This data includes various features associated with the pipeline and information about the delays at various stages of the pipeline. Many machine learning models are sensitive to the range and distribution of attribute values in the input data. Records having NULL values and/or missing features are therefore dropped from the historical data in step 104.

In some cases, the historical data (also referred to as the input dataset) may include the processing time(s) of various pipeline stages. In other cases, the processing time(s) of various pipeline stages are calculated from the historical data, before training, in step 106. In general, these processing times are treated as target values for model building during the training phase.

In the case of training one embodiment of an ML system for invoice processing, one or more of the following processing times may be computed as follows:
 receiving time=invoice received date−invoice date;
 processing time=processing end date−invoice received date;
 approval time (only for non purchase order (non-PO) invoice)=approval end time−processing end date; and
 payment time=payment end time−payment due date.

Outliers in the input dataset can skew and mislead the training process of machine learning algorithms resulting in longer training times and/or less accurate models and, ultimately, potentially poor results. Therefore, these outlier records may be removed at step 108. The outliers may be determined based on the values of one or more features and/or the processing times at different stages of the pipeline. Some embodiments use interquartile range (IQR) for outlier detection. Typically, IQR is the difference between the median of the first quartile (Q1) and the median of the third quartile (Q3), i.e., (IQR=Q3−Q1).

For example, in some embodiments, observations that fall below the value (Q1−1.5 IQR) and/or observations that are above the value (Q3+1.5 IQR) are considered outliers, and are removed from the input dataset in step 108. Some embodiments display the outliers using a boxplot. In a boxplot, the outlier values are indicated by whiskers of the box representing the non-outlier values. Often an additional bars at the ends of the whiskers are displayed, and any outliers are shown as individual points above or below the bars.

Many features associated with a pipeline can have categorical (i.e., textual or alphabetic) values. Since the training of an ML system can be simplified using numerical values, some embodiments employ label encoding to covert textual values to corresponding numerical values, in step 108. In general, label encoding is a process of converting the labels or textual data representing features into numerical values. In some cases, label encoding encodes labels with a value between 0 and n_classes−1, where n_classes is the number of distinct labels associated with a particular feature. If two or more features in an input dataset have the same label, label encoding assigns the same numerical value to all those features.

FIG. 2 illustrates an exemplary label encoding. In the context of invoice processing, one feature is "ISO Currency Code." This feature may have categorical values 202 such as EUR, JPY, RUB, etc. In some embodiments, these categorical values 202 are converted into corresponding numerical values 204, where the ML model generated during training uses the numerical values 204.

Referring back to FIG. 1, once the input dataset is formatted as described above, the resulting dataset, referred to as the formatted dataset, is divided into a training dataset and a test dataset, in step 110. The training set is used for training one or more embodiments of an ML system, and the test set is used for validating the ML models and the processing time/delay predictions generated by these embodiments. In some embodiments, the formatted data set is split using randomly selected data elements (also referred to as records) to have almost all of the variations of the formatted data in both the training set and the test set. A random number generation program (e.g., a pseudorandom number generator) may be used to generate random number, and using a random number, a record is selected and moved into either the training set or the test set, in step 110.

Various embodiments of the ML system described herein use predictive modeling to build a task specific model that makes predictions during inferencing, often in real-time, in response to receiving live triggers that initiate a pipelined process. The predictive model is derived in step 112 by training a machine learning system. During the training phase, an embodiment of the machine learning process learns certain properties of features and processing times for different stages from the training dataset.

Also in step 112, once the ML model is generated from the training dataset (which may be represented as a CSV (comma separated values) or EXCEL file), various embodiments of the trained ML system evaluate the predictions generated using the ML model using the test dataset. The model may then be saved as a pickle (.pkl) file in step 114. The pickle file may be deployed to a server for making real-time predictions during the inferencing phase.

Some embodiments of the ML system are ensemble systems. An ensemble ML system may be described as a meta-algorithm that combines several machine learning processes (also called machine learning subsystems) into one predictor in order to decrease variance in predictions by individual processes. An ensemble include several different ML subsystems where each subsystem is trained in a different manner from the other subsystems in the ensemble. Each subsystem learns a respective inferencing model, which are then aggregated and provided as an ML model of the ensemble.

A typical aggregation technique is the majority rule, where the classification performed by a majority of ML subsystems is selected as the classification provided by the ensemble. Other aggregation techniques, such as weighting the subsystems according to their respective error rates, selecting one or a specified number of subsystems having the least error rates and obtaining a consensus from the selected subsystems, etc., may also be employed in different embodiments.

AdaBoost is an ensemble that combines multiple weak classifiers (also called weak learners) into a single strong classifier (also called a strong learner). The weak learners in AdaBoost are decision trees with a single split, called decision stumps. AdaBoost puts more weight on difficult to classify inputs and less weight on those that are handled well, i.e., inputs that are relatively easy to classify.

Gradient boosting is used for regression and classification problems, and can produce a prediction model in the form of an ensemble of weak prediction models, typically decision trees. Gradient boosting builds trees one at a time, where each new tree helps to correct errors made by previously trained tree. Gradient boosting performs the optimization in the function space (rather than in the parameter space) which allows for an efficient use of custom loss functions. Gradient boosting generally focuses step by step on difficult examples that provide a robust strategy to deal with unbalanced datasets by strengthening the impact of the positive class.

The extra-tree method (that employs extremely randomized trees) may be used to randomizing tree building in the context of numerical input features, where the choice of the optimal cut-point is responsible for a large proportion of the variance of the induced tree. Where the classification problem may be characterized by a large number of numerical features varying more or less continuously, the extra-tree method can lead to increased accuracy due to its smoothing, and can significantly reduce the computational burden linked to the determination of optimal cut-points in standard trees and in random forests. The extra-tree method can produce piece-wise multilinear approximations, rather than the piece-wise constant ones.

FIG. 3 shows the performance of four different types of ensemble ML systems in predicting delays of an invoice processing pipeline. These ensemble ML systems include a random forest, an extra tree regression system, an AdaBoost system, and a gradient boost system. Each ML system was used to predict the processing time at different stages of an invoice processing pipeline, where the stages include: processing lag (panel 302); receiving lag (panel 304); approval lag (panel 306); and payment lag (panel 308).

As can be seen in FIG. 3, the random forest regressor generally provides the best R2 score (that describes the goodness of fit of a model with respect to the training dataset), and the least root mean squared error (RMSE), in predicting all four types of processing times (also called processing lags or delays). Therefore, in some embodiments a random forest regressor is used during the inferencing phase to predict the estimated number of days an invoice will take to process for a particular stage of the accounts payable process. Other types of ensemble ML systems may nevertheless be used during the inferencing phase.

Also, for different kinds of pipelined process (such as for diagnosis using images, maintenance of a power plant, maintenance of a manufacturing pipeline, etc.), different types of ensemble ML systems may be more suitable (e.g., more accurate) to predict the delays than other types of ensemble ML systems. Therefore, in some cases, referring back to step 112 of the process 100 (FIG. 1), several different types of ML systems are trained using the same training dataset, and their respective performance may be evaluated using the same test dataset. The model derived by the ML system having the best performance may be stored in step 114, and used during inferencing.

Figure 4:
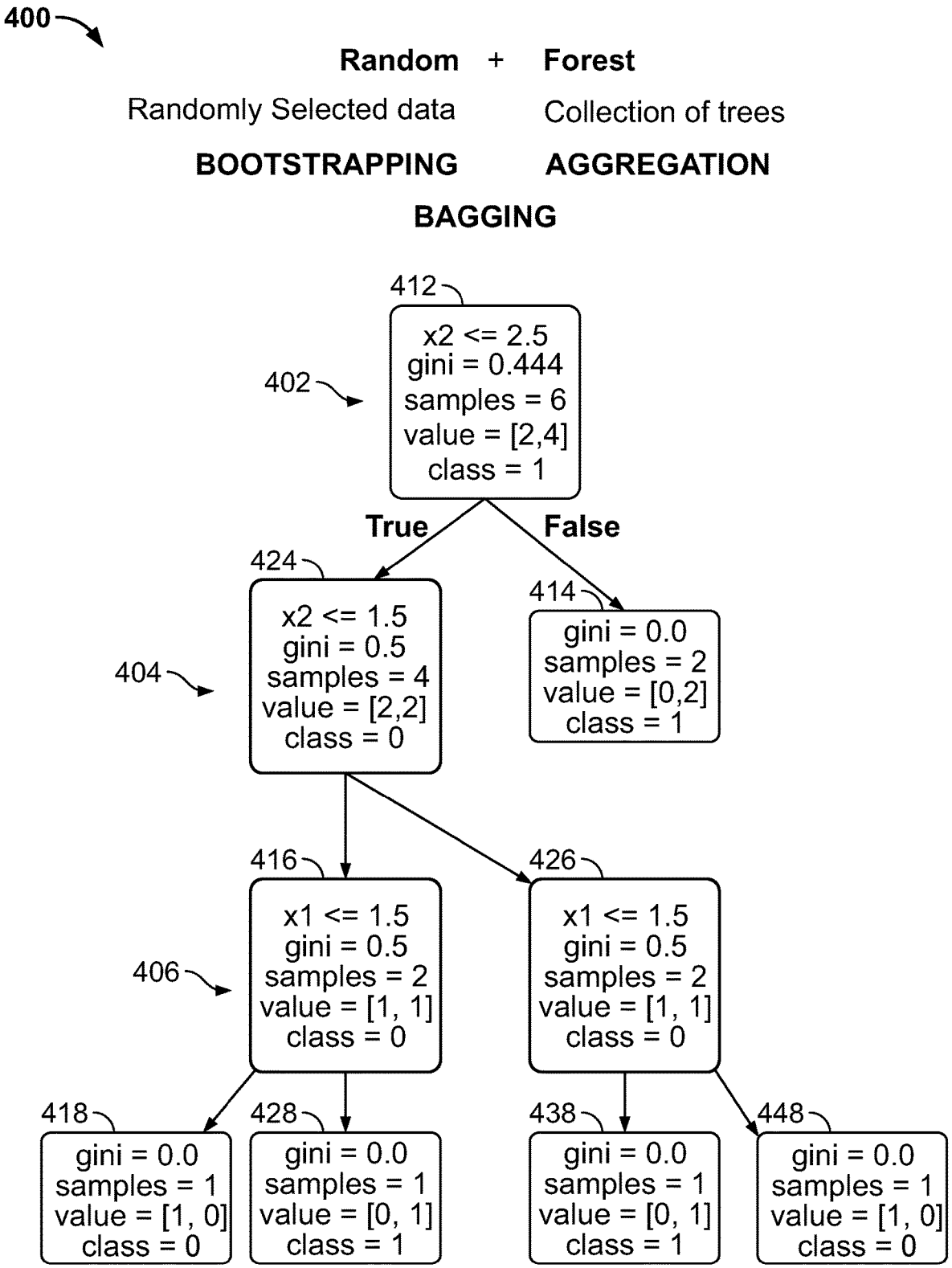
FIG. 4 schematically depicts and exemplary decision tree included in a random forest, according to one embodiment.

FIG. 4 depicts an exemplary decision tree used to build an embodiment of a random forest. A random forest (also called a random decision forest) is an ensemble learning technique for classification or regression. A random forest is built by training a number of individual decision trees (such as the tree 400) during the training phase. For classification, the mode of the classes inferred by the individual trees may be provided as the class inferred by the random forest. For regression, the mean of the individual predictions of the individual trees may be provided as the prediction of the random forest.

The tree 400 has several levels 402-406. At each level, one or more decision variables are tested using one or more parameter values. The decision variables generally correspond to the features of the pipeline to be analyzed, such as, e.g., the features shown in Table 1 above. In some cases, testing a feature with respect to a particular value provides an outcome that belongs to one and only one class. Such a classification is said to have associated therewith a gini index, that shows impurity of classification, of value zero. For example, at level 402, at node 412, the feature/variable "x2" is compared with a parameter value "2.5." If this comparison is false, the outcome always belongs to class 1. Because the outcome is always class 1 when x2 is greater than 2.5, the gini index of this classification is 0.0, as indicated at node 414 at level 404. On the other hand, when x2 is less than or equal to 2.5, the outcome may belong to class 1 or to class 0. As such, the gini index associated with node 424 is 0.5, indicating that further classification is needed.

At level 404, node 424, the same decision variable/feature "x2" is tested using a different parameter 1.5, which yields a further classification indicated by nodes 416, 426, at level 406. This classification is not pure or definitive, however, as indicated by non-zero gini indices at nodes 416, 426. As such, even further classification is needed. To this end, at nodes 416, 426, a decision variable/feature "x1" is selected and is compared with a parameter value 1.5. In each case, this classification provides a definitive classification, as indicated by nodes 418, 428, 428, 448, each of which has a gini index of 0.0. Node 428 indicates that the outcome belongs to class 1 when x2 is less than or equal to 1.5 and x1 is greater than 1.5. Likewise, node 438 indicates that the outcome belongs to class 1 when x2 is greater than 1.5 and x1 is less than or equal to 1.5.

The order in which a decision tree may select the decision variables at different levels is generally determined randomly. An individual decision tree, as an ML technique, has the tendency of overfitting to its training set. To avoid this, in some embodiments the individual tress forming a random forest are built as follows. Let the number of training cases in the training dataset used to train the entire random forest be N, and the number of decision variables/features in the classifier be M.

The number m of input variables to be used to determine the decision at a node of the tree is set to be m, where m is very small compared to M. For example m can be one or two magnitudes of order smaller than M. To avoid overfitting, a technique referred to as bagging may be employed, where one or more trees in the random forest are provided with respective training sets that are incomplete or are only portions of the entire training dataset used to train the complete random forest. Thus, if the entire training dataset includes N cases, one or more trees in the random forest may be trained using only n cases, where n is less than N.

In general, for any two trees $T_i$ and $T_j$ in the random forest, the number of cases in the respective training sets, $n_i$ and $n_j$, respectively, can be different or be the same. Bootstrap sampling may be used to select $n_i$ cases from the set of N cases to form a training set for the tree $T_i$, and to select $n_j$ cases from the set of N cases to form a training set for the tree $T_j$. The selection may be performed with replacement, i.e., the two training sets may overlap partially. For each tree, the cases that are not selected for training may be used for estimating the error of the tree in predicting.

For each tree, for each node, m variables on which to base the decision at that node are selected randomly, and the best split based on these m variables is computed. Each tree is fully grown and is not pruned, as may be done in constructing a single-tree classifier.

Figure 5:
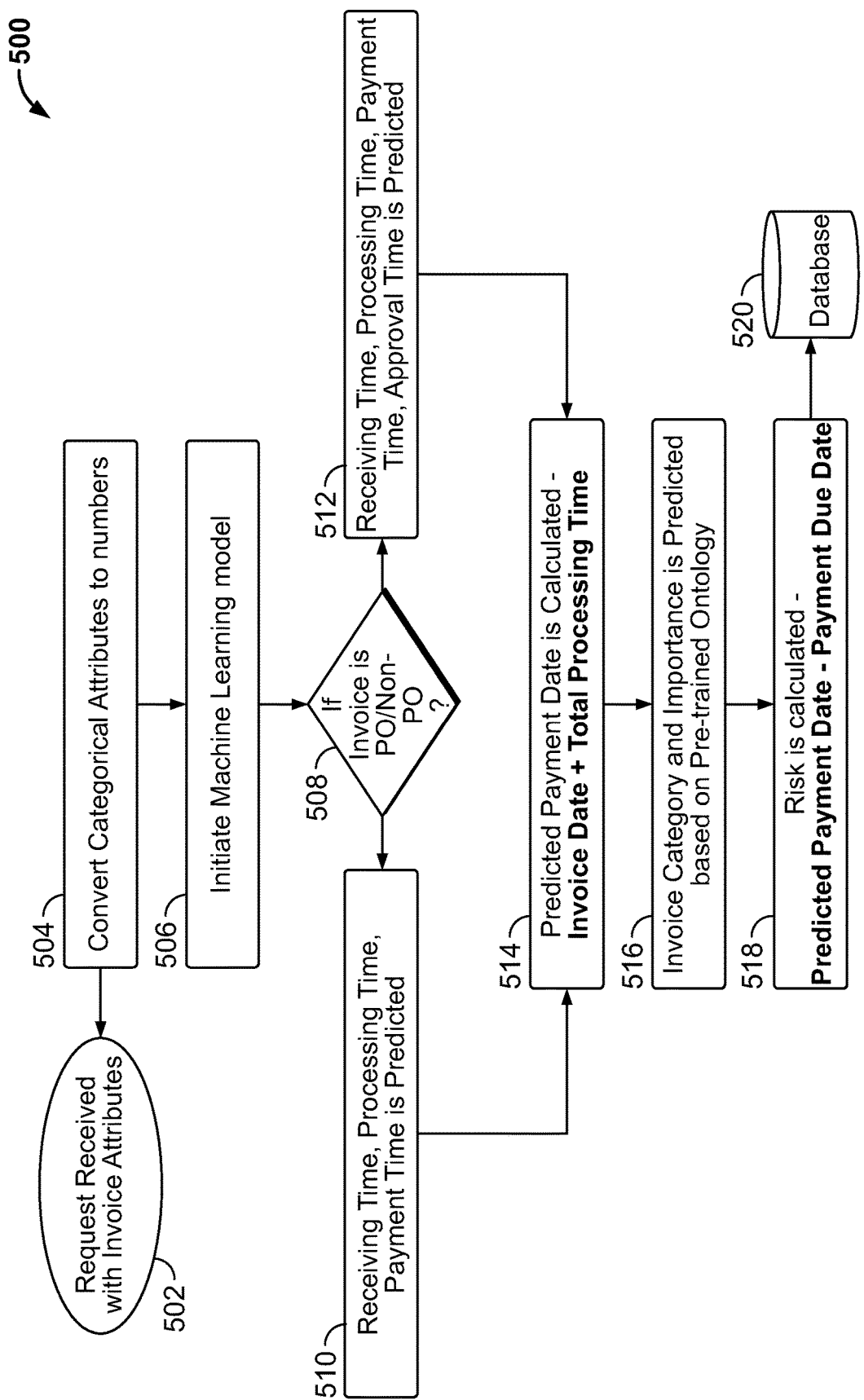
FIG. 5 is a flowchart of an inferencing process performed by a trained machine learning system, according to one embodiment.

FIG. 5 is a flow chart of an exemplary inferencing process performed using an embodiment of an ML system trained to predict delays in an invoice processing pipeline. Prediction commences when an invoice record (a record of a trigger event, in general, as described above) is created in the payment system. In the inferencing process 500, the invoice attributes including certain direct features are obtained at step 502. The trained ML system receives the invoice data and direct features (e.g., features 1-10 in Table 1 above) and may derive additional features at step 502. Categorical features may be converted into corresponding numerical features using a trained label encoder in step 504.

An embodiment of an ML system is initiated using an ML model, to provide a trained ML system, in step 506. In some embodiments, the trained ML system can be an ensemble ML system (e.g., a random forest) that includes several ML subsystems (e.g., a decision tree). The ML model may include a number of partial ML models, and each ML subsystem may be initiated using a respective partial ML model. One or more partial ML models may generally prevent overfitting of the corresponding ML subsystems to the training dataset used during the training phase.

After determining in step 508, whether the invoice is a purchase order (PO), the trained ML system computes the processing times at different stages of the pipeline. In particular, for POs the trained ML system computes or predicts the receiving time, the processing time, and the payment time, at step 510. For non-POs, the trained ML system additionally predicts the approval time as well, at step 512. In steps 510, 512, assignment delay may also be predicted, indicating a potential delay in start of invoice processing based on the current work load and available resource capacity.

At step 514, the processing times at different stages are used to predict a payment date, as the sum of the invoice date and the total processing time, which is the sum of the respective processing times at different pipeline stages. A pre-trained ontology may be used at the optional step 516 to determine the invoice category and importance. Payment delay risk is calculated at step 518, as the number of days between the predicted payment date and the payment due date. These predictions are stored in a database at step 520. If the risk value is greater than 0, there is a risk of the invoice payment being delayed. The invoice importance may then be used to expedite the processing of an important invoice.

Figure 6:
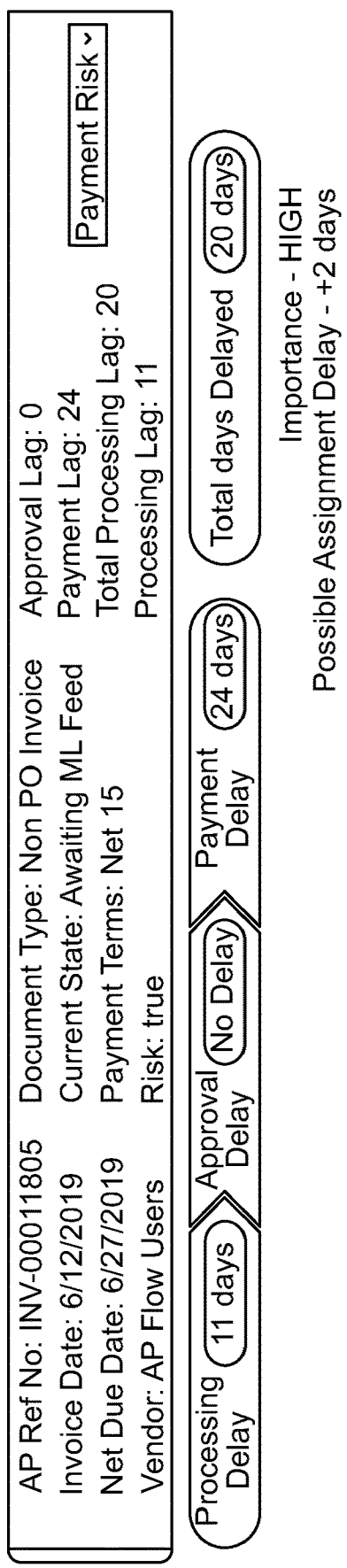
FIG. 6 is an example of the prediction of processing times and delays according to the inferencing process shown in FIG. 5.

FIG. 6 shows an example outcome of the inferences drawn by the trained ML system. In this example, the invoice date is Jun. 12, 2019 and the payment is due in 15 days, on Jun. 27, 2019. The trained ML system predicted a processing delay of 11 days and a payment delay of 24 days. No approval delay was predicted. As such, the expected payment date is July 17, and the predicted payment delay is 20 days. In addition, the trained ML system predicted an assignment delay of 2 days, which may result in a total payment delay of 22 days.

Category and Invoice Importance mapping is typically created based on the type of the pipeline to be analyzed. For example, in a manufacturing business raw material invoices may be of high importance and IT equipment invoices may be of low importance, but for a technology company IT equipment invoices may be of high importance. As such, the invoice importance mapping can be different for different types of businesses. Importance mapping can help a business prioritize the processing of invoices that are classified as important and may be at a risk of being delayed.

In some embodiments, re-training of the trained ML system is initiated via an automatic feedback mechanism. The feedback mechanism stores the information of all the positive, i.e., accurate, and negative, i.e., inaccurate, predictions. Whether a prediction for a particular stage and/or the overall pipeline is accurate can be determined by computing a difference between the actual processing time at a particular stage of the pipeline and the predicted time for that stage. The prediction may be considered approximately equal to the corresponding actual processing time and, therefore, accurate, if the difference is less than or equal to a specified threshold. The threshold may be specified as a percentage (e.g., 1%, 5%, 10%, 20%, etc.) of the corresponding actual delay. If the total count and/or percentage of the positive predictions falls below a defined threshold value (e.g., a user defined threshold value), re-training of the trained ML system may be initiated, so that the learned ML model can be improved to provide more accurate predictions.

For re-training, a new training dataset that includes recent data, (e.g., data collected within the past 3 months) is analyzed. The new training dataset is merged with the previously generated training dataset to create an updated training dataset. The trained ML system is then trained again, using the updated training dataset, for example, as described above with reference to FIG. 1.

Figure 7:
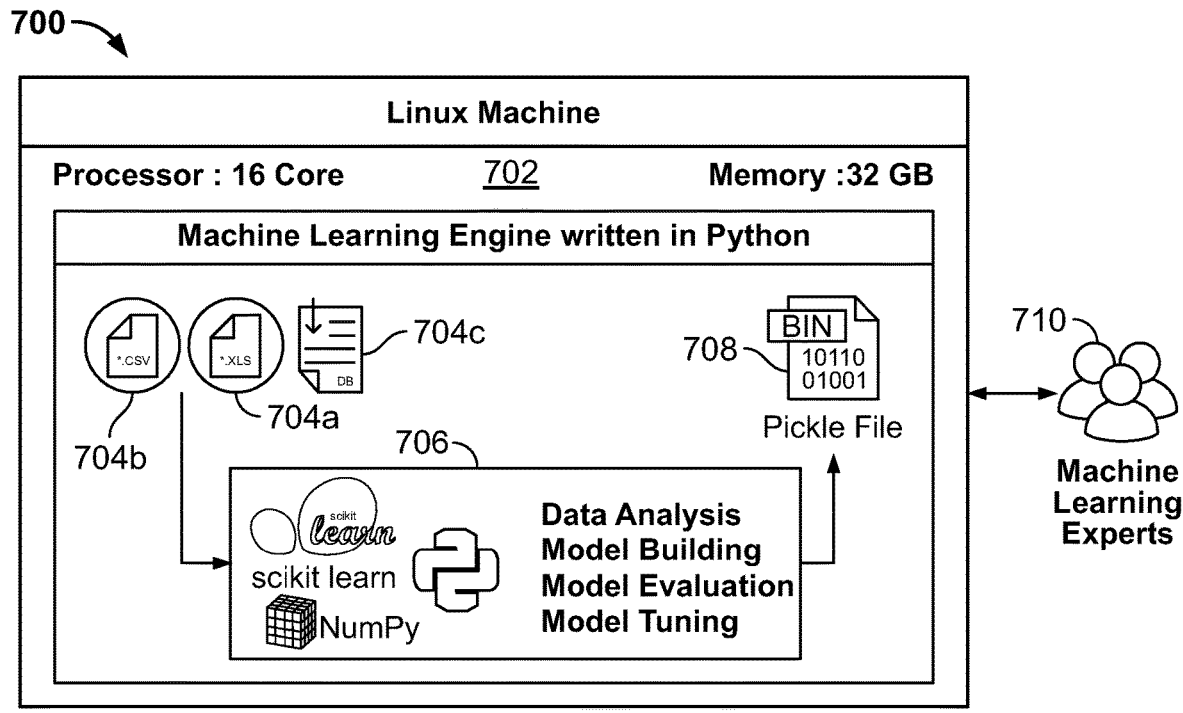
FIG. 7 is a training environment used for training a machine-learning system, according to one embodiment.
Figure 8:
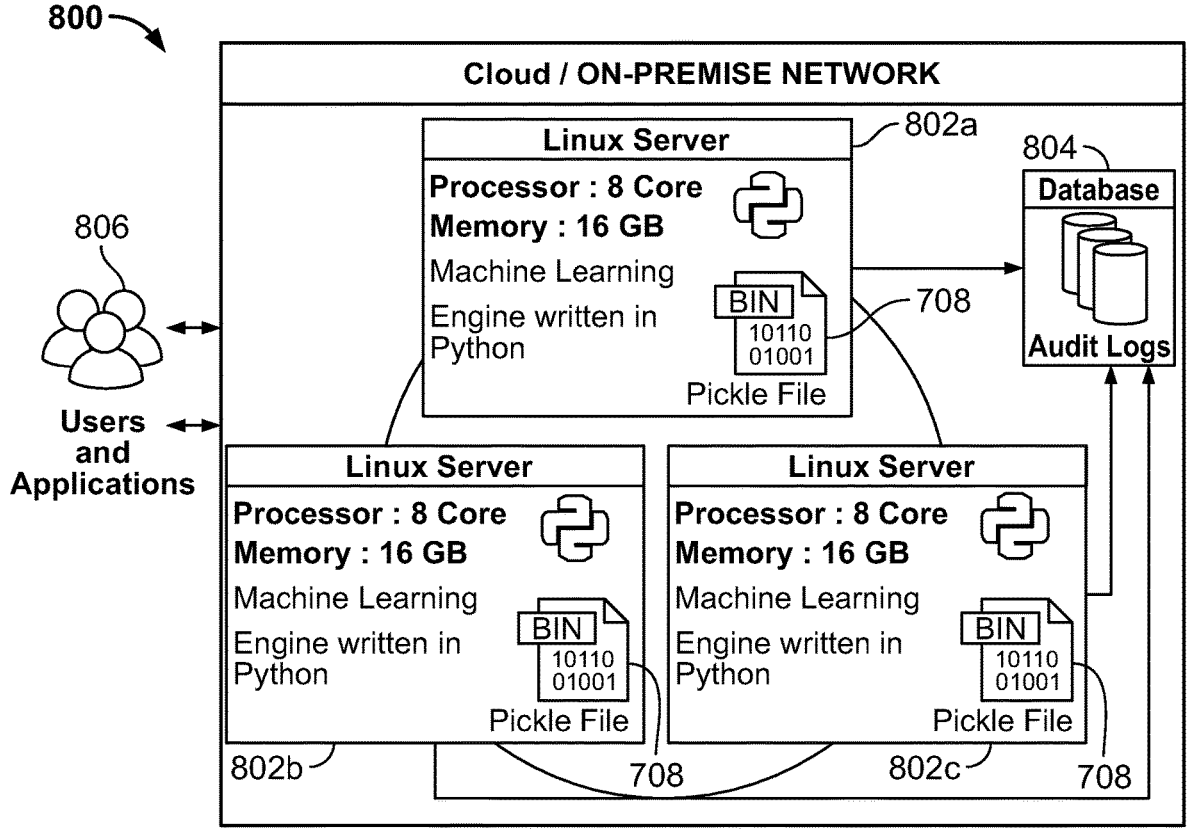
FIG. 8 is a prediction or inferencing environment in which a trained machine-learning system may be operated to perform prediction of processing times of a pipeline, according to one embodiment.

FIGS. 7 and 8 schematically depict the hardware environments for training and prediction, respectively. With respect to FIG. 7, in the environment 700 used to generate an ML model by training an ML system, a single computing apparatus 702 may perform analysis of the historical pipeline data, and the generation of the training and testing datasets, for example, according to the process described above with reference to FIG. 1. These datasets may be provided in the EXCEL format 704a or the CSV format 704b, or using a different database format 704c. After the data analysis, model building, evaluation, and tuning are completed, an embodiment of the ML system 706 is trained, and a final ML model 708 may be saved. The evaluation of the ML model, and initiation of tuning, e.g., using additional training cases, may be performed by ML experts 710. In some embodiments, the model 708 is saved as pickle (.pkl) file. The ML model 708 can be deployed to a prediction/inferencing environment, where it can be used to configure one or more ML systems to perform inferencing as learned during the training phase, and as represented in the stored ML model 708.

With reference to FIG. 8, a real-time-prediction environment 800 includes multiple servers 802a, 802b, 802c that are connected to a proprietary network and/or the Internet, where each server implements a respective ML system (also referred to as an ML engine). Using multiple servers, a distribution of the inferencing load can be achieved. Each server 802a-802c receives the stored ML model 708 and, using the model, the respective ML engines are configured to perform predictions as learned during the training phase. The prediction environment 800 also includes a database which 804 stores all the predictions and audit logs. The audit logs can help in re-training of the model 708, as needed. External applications and/or users 806, that need the delay predictions, can connect to the environment 800 via the Internet and/or the proprietary network.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for training a machine learning (ML) system, the method comprising:
   receiving labelled data pertaining to a pipeline, the labelled data comprising trigger objects initiating the pipeline and target processing times corresponding to a plurality of stages of the pipeline;
   identifying one or more features associated with the trigger objects;
   splitting the labelled data into a full training dataset and a testing dataset;
   in an ensemble ML system, training each of a plurality of ML subsystems using a respective partial dataset of the full training dataset, to provide a respective individual inference model;
   identifying and analyzing, using the respective individual inference model, feature patterns between delay and each of the one or more features;
   predicting, using the respective individual inference model and based on the feature patterns, a respective processing time at each of the plurality of stages of the pipeline in terms of at least one feature;
   computing, for each of the plurality of ML subsystems, a respective error rate using the testing dataset; and
   deriving and storing an ML model by aggregating the individual inference models based on a particular type of the pipeline and weighting the corresponding subsystems according to their error rates.

2. The method of claim 1, wherein identifying the one or more features comprises identifying at least one direct feature and at least one derived feature.

3. The method of claim 1, prior to splitting the labelled data, further comprising performing one or more of:
   excluding null or incomplete records from the labelled data;
   excluding one or more outliers from the labelled data; or
   encoding a categorical feature into a corresponding numerical feature.

4. The method of claim 1, wherein the ensemble ML system is selected from a group consisting of: a random forest system, an AdaBoost system, a gradient boosting system, and an extra-tree system.

5. The method of claim 1, wherein the respective error rate adjusts the training of the respective subsystems.

6. The method of claim 1, further comprising:
   receiving the labelled data from inferencing phase;
   updating historical labelled data by including therein the labelled inference data; and
   repeating the splitting, training, and deriving and storing steps using the updated historical labelled data.

7. The method of claim 1, wherein:
   the pipeline is an invoice-processing pipeline; and
   the trigger objects are invoices.

8. The method of claim 1, further comprising:
   determining a total prediction time by summing up the respective processing time predicted at each of the plurality of stages,
   wherein deriving and storing the ML model by aggregating the individual inference models is based on the determined total prediction time.

9. A method for predicting processing times of a pipeline, the method comprising:
   receiving a trigger object initiating the pipeline;
   initiating a machine learning (ML) system using an ML model associating features of the trigger with processing times at a plurality of stages of the pipeline;
   extracting features of the trigger object;
   training each of a plurality of ML subsystems of the ML system to provide a respective individual inference model;
   identifying and analyzing, using the respective individual inference model, feature patterns between delay and each of the one or more features; and
   inferring each processing time at each of the plurality of stages of the pipeline by processing the features using the ML system and based on the feature patterns,
   wherein processing the features comprises:
      computing, for each of the plurality of ML subsystems, a respective error rate; and
      deriving and storing the ML model by aggregating the individual inference models based on a particular type of the pipeline and weighting the corresponding subsystems according to their error rates.

10. The method of claim 9, wherein:
    the ML system is an ensemble ML system comprising the plurality of ML subsystems;
    the ML model comprises a plurality of partial ML models; and
    initiating the ML system comprises initiating each ML subsystem using a respective partial ML model.

11. The method of claim 10, wherein the ensemble ML system is selected from a group consisting of: a random forest system, an AdaBoost system, a gradient boosting system, and an extra-tree system.

12. The method of claim 9, further comprising:
    generating one or more derived features from one or more extracted features; or
    encoding a categorical feature into a corresponding numerical feature.

13. The method of claim 9, wherein:
    the pipeline is an invoice-processing pipeline;
    the trigger object is an invoice; and
    one or more processing times at each of the plurality of stages include one or more of: (i) invoice receiving time, (ii) invoice assignment time, (iii) invoice processing time, (iv) invoice approval time, and (v) payment time.

14. The method of claim 13, further comprising:
    identifying a category and importance of the invoice; and
    displaying a predicted payment delay computed using the one or more processing times.

15. The method of claim 13, further comprising:
designating an inferred outcome as positive if a predicted payment delay computed using the one or more processing times is approximately equal to an actual payment delay, and otherwise, designating the inferred outcome as negative;
determining that a count or a percentage of positive outcomes is less than a specified threshold; and
initiating re-training of the ML system.

16. The method of claim 9, further comprising:
determining a total prediction time by summing up each processing time inferred at each of the plurality of stages.

17. A training system comprising:
a processor; and
a memory in communication with the processor and comprising instructions which, when executed by the processor, program the processor to:
receive labelled data pertaining to a pipeline, the labelled data comprising trigger objects initiating the pipeline and target processing times corresponding to a plurality of stages of the pipeline;
identify one or more features associated with the trigger objects;
split the labelled data into a full training dataset and a testing dataset;
in an ensemble machine learning (ML) system, train each of a plurality of ML subsystems using a respective partial dataset of the full training dataset, to provide a respective individual inference model;
identify and analyze, using the respective individual inference model, feature patterns between delay and each of the one or more features;
predict, using the respective individual inference model and based on the feature patterns, a respective processing time at each of the plurality of stages of the pipeline in terms of at least one feature;
compute, for each of the plurality of ML subsystems, a respective error rate using the testing dataset; and
derive and store an ML model by aggregating the individual inference models based on a particular type of the pipeline and weighting the corresponding subsystems according to their error rates.

18. The system of claim 17, wherein to identify the one or more features, the instructions further program the processor to:
identify at least one direct feature and at least one derived feature.

19. The system of claim 17, wherein prior to splitting the labelled data, the instructions further program the processor to:
exclude null or incomplete records from the labelled data;
exclude one or more outliers from the labelled data; or
encode a categorical feature into a corresponding numerical feature.

20. The system of claim 17, wherein the ensemble ML system is selected from a group consisting of: a random forest system, an AdaBoost system, a gradient boosting system, and an extra-tree system.

21. The system of claim 17, wherein the respective error rate adjusts the training of the respective subsystems.

22. The system of claim 17, wherein the instructions further program the processor to:
receive labelled data from inferencing phase;
update historical labelled data by including therein the labelled inference data; and
repeat the split, train, and derive and store operations using the updated historical labelled data.

23. The system of claim 17, wherein:
the pipeline is an invoice-processing pipeline; and
the trigger objects are invoices.

24. A training system comprising:
a processor; and
a memory in communication with the processor and comprising instructions which, when executed by the processor, program the processor to:
receive a trigger object initiating a pipeline;
initiate a machine learning (ML) system using an ML model associating features of the trigger with processing times at a plurality of stages of the pipeline;
extract features of the trigger object;
train each of a plurality of ML subsystems of the ML system to provide a respective individual inference model;
identify and analyze, using the respective individual inference model, feature patterns between delay and each of the one or more features; and
infer each processing time at each of the plurality of stages of the pipeline by processing the features using the ML system and based on the feature patterns,
wherein to process the features, the instructions further program the processor to:
compute, for each of the plurality of ML subsystems, a respective error derive and store the ML model by aggregating the individual inference rate; and
models based on a particular type of the pipeline and weighting the corresponding subsystems according to their error rates.

25. The system of claim 24, wherein:
the ML system is an ensemble ML system comprising the plurality of ML subsystems;
the ML model comprises a plurality of partial ML models; and
to initiate the ML system, the instructions further program the processor to initiate each ML subsystem using a respective partial ML model.

26. The system of claim 25, wherein the ensemble ML system is selected from a group consisting of: a random forest system, an AdaBoost system, a gradient boosting system, and an extra-tree system.

27. The system of claim 24, wherein the instructions further program the processor to:
generate one or more derived features from one or more extracted features; or
encode a categorical feature into a corresponding numerical feature.

28. The system of claim 24, wherein:
the pipeline is an invoice-processing pipeline;
the trigger object is an invoice; and
one or more processing times at each of the plurality of stages include one or more of: (i) invoice receiving time, (ii) invoice assignment time, (iii) invoice processing time, (iv) invoice approval time, and (v) payment time.

29. The system of claim 28, wherein the instructions further program the processor to:
identify a category and importance of the invoice; and
display a predicted payment delay computed using the one or more processing times.

30. The system of claim 28, wherein the instructions further program the processor to:

designate an inferred outcome as positive if a predicted payment delay computed using the one or more processing times is approximately equal to an actual payment delay, and otherwise, designate the inferred outcome as negative;

determine that a count or a percentage of positive outcomes is less than a specified threshold; and initiate re-training of the ML system.

31. The system of claim 22, wherein:

the processor is configured to implement at least a part of the ML system.

* * * * *

UNITED STATES PATENT AND TRADEMARK OFFICE
CERTIFICATE OF CORRECTION

PATENT NO. : 11,775,877 B2  
APPLICATION NO. : 16/863841  
DATED : October 3, 2023  
INVENTOR(S) : Mor et al.

Page 1 of 1

It is certified that error appears in the above-identified patent and that said Letters Patent is hereby corrected as shown below:

In the Claims

In Column 16, Claim number 24:  
Line 30, insert --rate; and-- after "a respective error";  
Line 31, delete "rate; and".

In Column 17, Claim number 31:  
Line 9, reads The system of claim 22, wherein: should read, The system of claim 24, wherein:

Signed and Sealed this
Twenty-eighth Day of November, 2023

Katherine Kelly Vidal  
*Director of the United States Patent and Trademark Office*